W. R. McCOMB.
PROCESS AND APPARATUS FOR HARVESTING COTTON.
APPLICATION FILED JAN. 3, 1910.
1,041,650.
Patented Oct. 15, 1912.
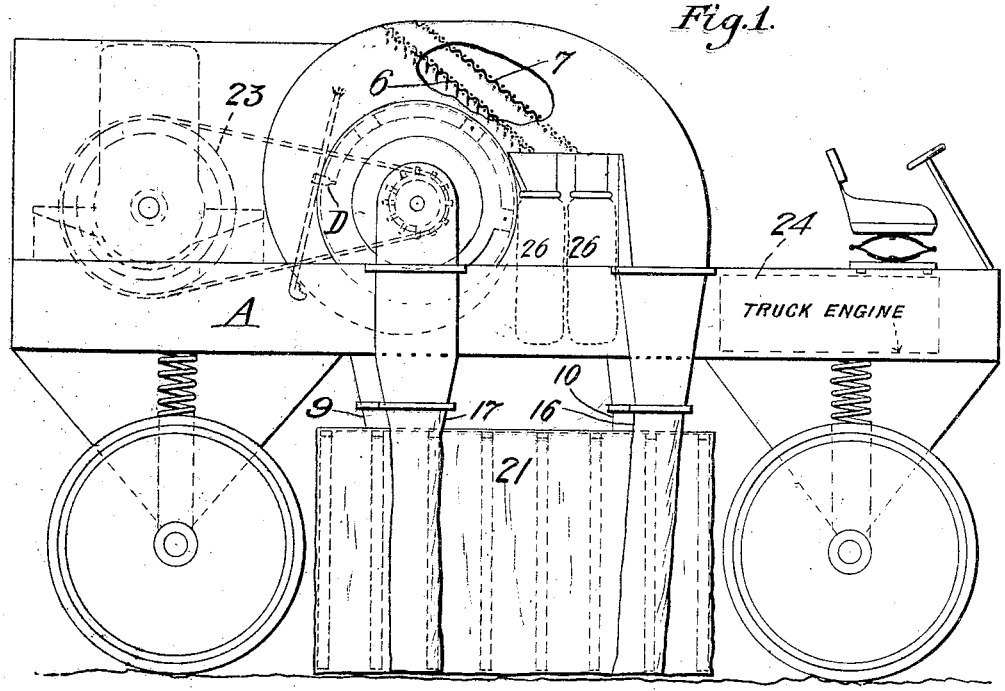
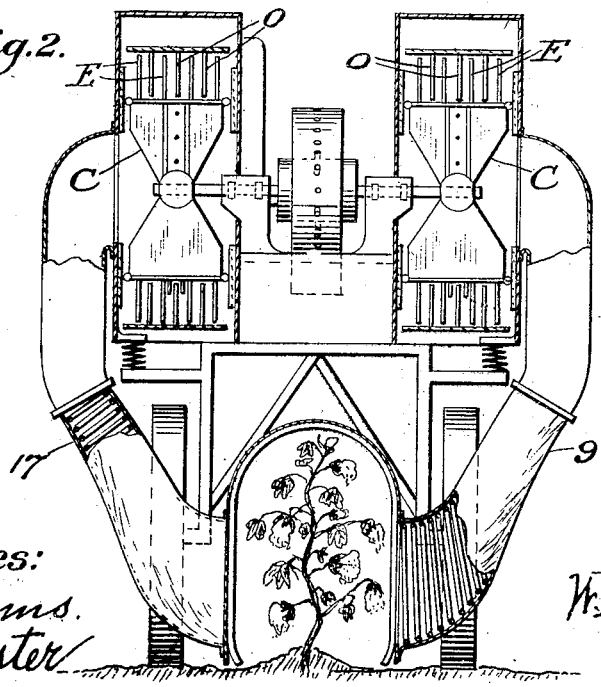
Witnesses:
L. E. Adams.
W. A. Hiester.
Inventor:
W. R. McComb.

UNITED STATES PATENT OFFICE.

WILLIE ROBERT McCOMB, OF SAN FRANCISCO, CALIFORNIA.

PROCESS AND APPARATUS FOR HARVESTING COTTON.

1,041,650.  Specification of Letters Patent.  Patented Oct. 15, 1912.

Application filed January 3, 1910. Serial No. 536,237.

*To all whom it may concern:*

Be it known that I, WILLIE ROBERT McCOMB, a citizen of the United States of America, and a resident of San Francisco, in the county of San Francisco and State of California, have invented certain new and useful Improvements in Processes and Apparatus for Harvesting Cotton, of which the following is a specification.

My invention relates to a process of harvesting cotton which comprises charging the cotton on the plants with electricity to cause it to expand, and removing and harvesting the cotton when thus expanded by means of a current of electrified air, and to apparatus for carrying out this process, shown in the accompanying drawings, in which like parts are designated by like characters throughout, and in which—

Figure 1 is a side elevation of my machine, partly broken away, and Fig. 2 is an end elevation thereof, parts being removed, broken away, or shown in section.

The apparatus comprises a motor vehicle A, propelled by a suitable motor 24, said vehicle having a platform carrying a motor 23, which by means of suitable pulleys and a belt drives the fan blades C, which rotate in blower casings, located on opposite sides of the platform.

Mounted underneath the platform is a hood 21 formed of canvas stretched over U-shaped metal frame members, which straddle the cotton plant when the machine is in operation, as shown in Fig. 2; conduits 9 and 17 lead from this hood to the respective inlets of the blowers, and conduits 10 and 16 lead from the respective outlets of the blowers to the hood.

Mounted on the fan blades C to rotate therewith are plates E of a static electrical machine, which coöperate with the relatively fixed plates O, of the static machine. As the specific construction of the static machine is immaterial it is not described in detail.

6 and 7 are deflecting screens arranged adjacent the outlet of the fans.

Receptacles 26 are provided adjacent these screens, for the cotton.

The operation is as follows: The vehicle is propelled along a row of cotton plants so that the hood 21 straddles the row. The motor 23 drives the fan blades C causing air to flow from the blower casings through conduits 10 and 16 to the hood 21, and over vibrating spark D from the hood 21 through conduits 9 and 17 to and through the blower casings. The air flowing through the casings is charged with electricity by the static machines, and passing to the hood 21 charges the cotton on the plants with electricity causing the cotton to expand. In its expanded condition the cotton is removed from the plant by the flow of air in the hood (its expanded condition making it more easily removable by air currents than it would otherwise be) and is carried through the conduits 9 and 17 to and through the blower casings to the screens 6 and 7 which deflect it into the receptacles 26, the screens allowing the dust and trash to pass through.

Having thus described my invention, what I claim as new and desire to secure by Letters Patent is:

1. The process of harvesting cotton, which consists in charging the cotton on the plant with electricity to cause it to expand and removing and harvesting the cotton when thus expanded, by means of a current of electrified air.

2. A cotton harvester comprising a source of compressed air, a source of rarefied air, an air conduit leading from said compressed air source adapted to be applied to the cotton plant, an air conduit leading to the source of rarefied air, adapted to be applied to the cotton plant, and means for supplying electricity to the first said conduit.

3. A cotton harvester comprising a source of compressed air, a source of rarefied air, a member having a recess to receive the cotton plants, a conduit leading from said first source to said recess, a conduit leading from said recess to said second source, and means for supplying electricity to the first said conduit.

4. A cotton harvester comprising a blower having an inlet and an outlet, a member having a recess to receive the cotton plants, a conduit leading from said recess to said inlet, a conduit leading from said outlet to said chamber and means for supplying electricity to one of said conduits.

5. A cotton harvester comprising a blower having an outlet and a rotatable fan, an air conduit including a passage leading from said outlet and a machine for supplying electricity to said conduit, including a rotatable member mounted coaxially with said fan.

WILLIE ROBERT McCOMB.

Witnesses:
CHARLES H. KASTENBEN,
THOMAS F. HOWARD,
L. E. ADAMS.

Copies of this patent may be obtained for five cents each, by addressing the "Commissioner of Patents, Washington, D. C."